US010623838B1

(12) United States Patent
Mahdi Hayder et al.

(10) Patent No.: US 10,623,838 B1
(45) Date of Patent: Apr. 14, 2020

(54) OPTICAL TRANSCEIVERS WITH INDEPENDENTLY RELEASABLE FIBER CONNECTORS

(71) Applicant: Amazon Technologies, Inc., Seattle, WA (US)

(72) Inventors: Alaa Adel Mahdi Hayder, Seattle, WA (US); Kanika Gupta, Seattle, WA (US); Jason Eslick, Brush Prairie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/827,749

(22) Filed: Nov. 30, 2017

(51) Int. Cl.
  *G02B 6/36* (2006.01)
  *G02B 6/28* (2006.01)
  *G02B 6/26* (2006.01)
  *G02B 6/38* (2006.01)
  *H04Q 11/00* (2006.01)
  *H04L 12/46* (2006.01)
  *H04B 10/071* (2013.01)

(52) U.S. Cl.
  CPC ....... *H04Q 11/0067* (2013.01); *G02B 6/3817* (2013.01); *G02B 6/3882* (2013.01); *H04B 10/071* (2013.01); *H04L 12/4604* (2013.01)

(58) Field of Classification Search
  CPC ........... H04Q 11/0067; H04Q 11/0003; H04Q 1/136; H04L 2012/445; H04L 12/46; H04L 12/4604; H04B 10/071; G02B 6/3817; G02B 6/3882

USPC ... 385/24, 31, 39, 54, 55, 59, 71, 76, 89, 90
See application file for complete search history.

(56) References Cited

U.S. PATENT DOCUMENTS

| | | |
|---|---|---|
| 2003/0039014 A1* | 2/2003 | English ............... H04B 10/801 398/164 |
| 2015/0363343 A1 | 12/2015 | Adhikesavalu et al. |
| 2017/0034597 A1* | 2/2017 | Shih ....................... H04Q 1/136 |
| 2018/0259722 A1* | 9/2018 | Raza .................... G02B 6/3897 |

* cited by examiner

*Primary Examiner* — Kaveh C Kianni
*Assistant Examiner* — Hung Q Lam
(74) *Attorney, Agent, or Firm* — Kilpatrick Townsend & Stockton LLP

(57) ABSTRACT

An apparatus can include an optical transceiver having a body with a first end at which a circuitry interface is located to facilitate transfer of data between a network appliance and the optical transceiver. The apparatus further includes a four-cable interface at a second end of the body. The four-cable interface releasably receives four independently releasable connectors for transfer of optical signals between the optical transceiver and respective ferrules of the four independently releasable connectors. In some examples, a carrier may be provided that is releasably connected with the four-cable interface and that includes four sockets for respectively independently receiving the four independently receivable connectors so as to facilitate collective insertion and removal of the four independently releasable connectors relative to the four-cable interface.

5 Claims, 3 Drawing Sheets

US 10,623,838 B1

OPTICAL TRANSCEIVERS WITH INDEPENDENTLY RELEASABLE FIBER CONNECTORS

BACKGROUND

Datacenters house collections of network appliances, such as servers and networking hardware, including switches and routers. Often many different cabled connections between components are used to connect the components, for example, to permit data transfer between the components. The number of connections for any given component can quickly become nontrivial as one component may connect to tens or hundreds of other components through such cabled connections. Accompanying structure to accommodate such connections can also occupy space and thus reduce total space that can be available for components that contribute computing power within a datacenter. As a result of these and other considerations, factors such as size, number, reliability, and extent of labor associated with installation or maintenance of such connectors can all significantly contribute to cost efficiency of operating a datacenter.

BRIEF DESCRIPTION OF THE DRAWINGS

Various embodiments in accordance with the present disclosure will be described with reference to the drawings, in which.

DETAILED DESCRIPTION

Figure 1:
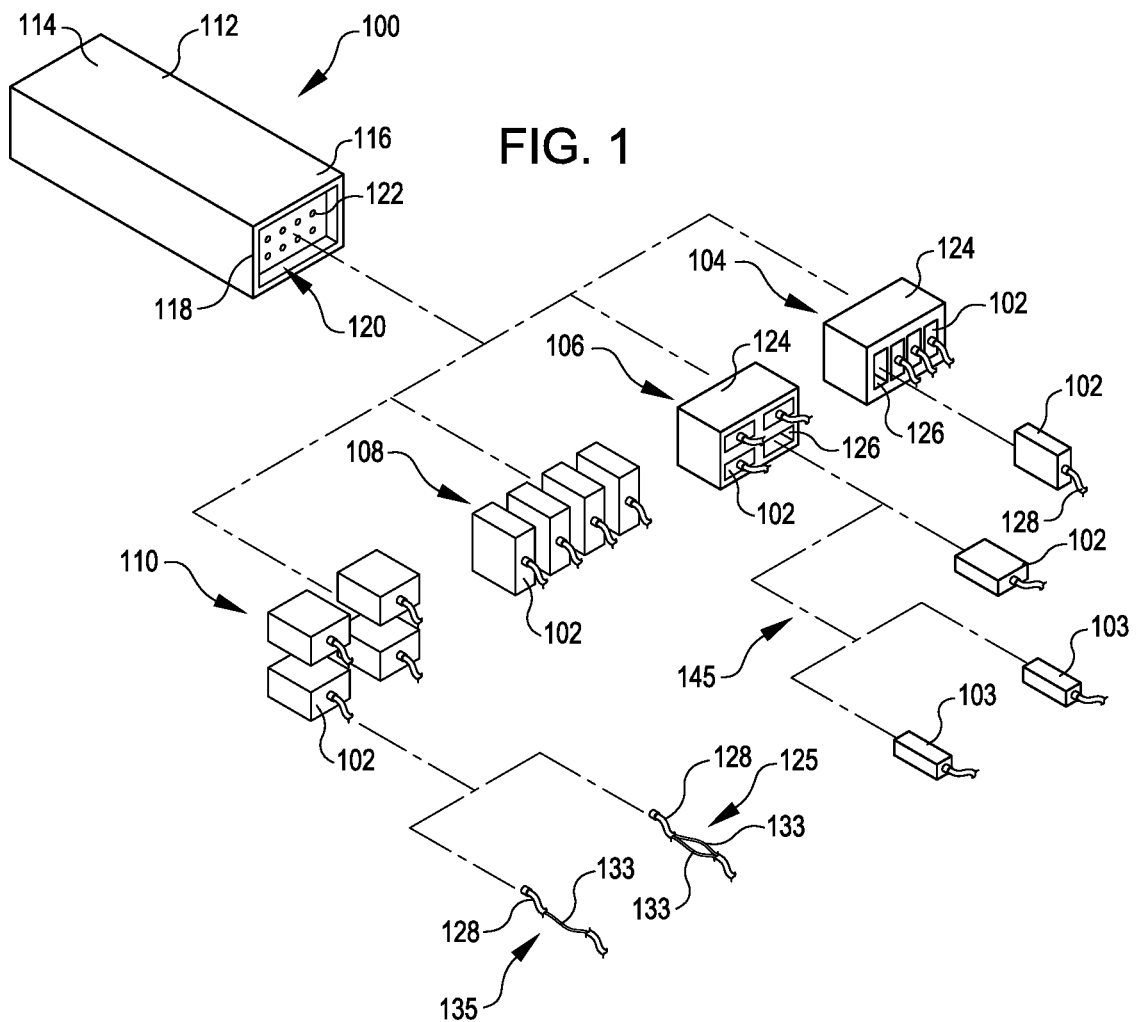
FIG. 1 illustrates an example of a transceiver capable of receiving four independently releasable connectors according to various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Various embodiments herein are directed to cabling arrangements within data centers or other locations that feature optical transceivers having interfaces for receiving four independently releasable connectors. The connectors may be at the end of respective cables that allow connection between the transceiver and other transceivers for data communication. For example, the connectors may include respective fiber optic ferrules along which optical signals can be sent for data communication. Allowing the cables to be independently or individually released from engagement with the transceiver can facilitate ease of inspection or maintenance with respect to cabling arrangements.

In some embodiments, the transceiver can receive a carrier that functions as an intermediary between a transceiver and the independently releasable connectors. For example, the carrier can receive each of the four fiber connectors at the end of respective cables and then be inserted into the interface of the transceiver so that all four of the cables and respective connectors can be coupled to the transceiver collectively in one motion. The carrier can allow the independent cables and their connectors to be collectively removed from the transceiver, for example, so that the relative placement of the connectors at the transceiver need not be specifically recalled when plugging into a replacement transceiver. The carrier can also allow the independent cables and their connectors to be individually coupled or decoupled relative to the transceiver, such as by inserting or removing one connector at a time from the carrier.

Reference will now be made to the Figures, in which like reference numerals refer to like elements throughout the Figures. In many instances, similar elements may be identified by the same reference numeral and differentiated by a different letter suffix in the Figures. Thus in the following text description, elements may be referenced with suffixes (e.g., for referencing individual or specific elements such as a first transceiver 200A or a second transceiver 200B) or without suffixes (e.g., for generally or collectively referencing elements such as one or more of the transceivers 200).

FIG. 1 illustrates an example of a transceiver 100 capable of receiving four independently releasable connectors 102. Various arrangements 104, 106, 108, and 110 of the connectors are depicted in FIG. 1. The various arrangements 104, 106, 108, and 110 may be used in lieu of one another according to various embodiments.

The transceiver 100 depicted in FIG. 1 includes a body 112. At a first end 114 of the body 112, the transceiver 100 can include appropriate structure for engaging a network switch or other form of appliance used in a data center, such as described in greater detail with respect to FIG. 4. The transceiver 100 may correspond to any suitable form factor of transceiver 100. For example, the body 112 and other components of the transceiver 100 may be sized and arranged to meet any suitable standard for pluggable optical transceivers. Non-limiting examples include QSFP, QSFP+, QSFP28, QSFP56, QSFP56-DD, OSFP, or other standards that may be known in the art.

At a second end 116 of the body 112, the transceiver 100 includes an interface 118, which hereinafter may also be referred to as a four-cable interface 118. The interface 118 can include a suitable recess or series of recesses 120, in which may be exposed alignment features 122. Each connector 102 may include two ferrules that align with two of the respective alignment features 122. For example, the alignment features 122 can correspond to recesses, bosses, or other structure within the transceiver 100 that include fiber optic ferrules for carrying optical transmissions of data. The alignment features 122 may be arranged in a manner that will align for transfer of optical signals from ferrules in the transceiver 100 into corresponding ferrules in the connectors 102. For example, respective connectors 102 may be inserted into the recess 120 to align with respective alignment features 122.

In the first arrangement 104 (depicted to the right side of FIG. 1), the connectors 102 are arranged in a single row of the four connectors 102, or in a one by four array. The connectors 102 are also shown individually releasable or independently releasable from a carrier 124. For example, each connector 102 may be independently receivable in a respective socket 126 of the carrier 124. In use, the carrier 124 may receive the four connectors 102 and then be inserted into the interface 118 of the transceiver 100. This may allow all of the connectors 102 to be collectively aligned together upon insertion of the carrier 124 into the transceiver 100.

The carrier 124 may also allow the connectors 102 to be collectively removed from the transceiver 100. For example, such collective removal and/or installation of the connectors 102 relative to the transceiver 100 via the carrier 124 may facilitate a speed of labor, such as when replacing a transceiver 100. As an illustrative example, a technician may remove the carrier 124 in order to remove all of the connectors 102 in one motion, replace the transceiver 100, and then place the carrier 124 into the new transceiver 100 in single subsequent motion. Such an operation may be much faster than individually inserting each of the connectors 102 into the transceiver 100. Such an operation may also allow the technician to make a change without having to remember the relative arrangement of the connectors 102 relative to the transceiver 100.

The connectors 102 can also be individually removed from the carrier 124, for example, to remove the connector 102 independently from the transceiver 100. This may allow a technician to remove an individual connector 102 in order to change a cable 128 associated therewith without having to also necessarily replace the other connectors 102 and associated cables 128. This may facilitate ease of troubleshooting among different cables 128 used for establishing connection between transceivers 100. Additionally, the releasable nature of the connectors can allow for ease of checking and replacing the transceiver 100 if the transceiver is faulty or checking and replacing just the cable 128 or connector 102 if that is the faulty component in the connection.

The second arrangement 106 (second from the right in FIG. 1) also includes a carrier 124. The carrier 124 may provide similar effect and benefit as that in the first arrangement 104. The carrier 124 in the second arrangement 106 differs from that in the first arrangement 104 in that the connectors 102 are arranged differently. Specifically, whereas the connectors 102 in the first arrangement 104 are arranged in a one by four array, the connectors 102 in the second arrangement 106 are arranged in a two by two grid, e.g., in two rows of two. This may correspond to the connectors 102 having rectangular bodies that are arranged so that a length or greatest dimensions of each rectangular body is oriented in a horizontal alignment in the second arrangement 106, in contrast to a vertical alignment provided in the first arrangement 104.

The third arrangement 108 (second from the left in FIG. 1) includes a set of four connectors 102 that can engage the transceiver 100 without an intervening structure such as the carrier 124. The third arrangement 108 may feature connectors that are slightly larger than the connectors 102 of the first arrangement 104 or the second arrangement 106, for example, to collectively occupy a like area of the interface 118 of the transceiver 100 that is occupied by the carrier 124 when received.

The fourth arrangement 110 (at the left in FIG. 1) includes connectors 102 arranged in a two by two grid with two rows of two connectors 102, much like in the second arrangement 106. In contrast to the second arrangement 106 and similarly to the third arrangement 108, the fourth arrangement 110 may be sized to fit within the recess 120 or otherwise engage a portion of the interface 118 of the transceiver 100 without a carrier 124 or other intervening structure.

Figure 2:
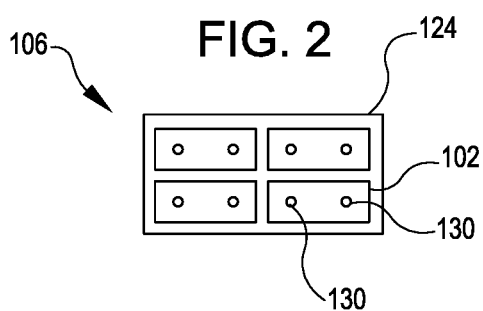
FIG. 2 illustrates an end view of one of the arrangements of connectors of FIG. 1 according to various embodiments.

FIG. 2 illustrates an end view of connectors 102 received in a carrier 124 corresponding to the second arrangement 106 in FIG. 1. In FIG. 2, ferrules 130 can be seen. Generally, the ferrule 130 may correspond to any structure that at least partially surrounds a glass core of a fiber optic line. Typically, the ferrule 130 will include at least one opening or other light transmission passageway through which light conveyed by a fiber optic core can travel into or out of the core, such as to or from another fiber optic cable or a compatible device or adaptor. The ferrule 130 shown in FIG. 2 may correspond to any suitable structure relative to the connector 102, including, but not limited to extending outward from a body that defines a substantial other portion of the connector 102 (e.g., similar to a ferrule extending outward in an LC connector), extending from an edge of the connector 102, recessed from an edge of the connector 102 (e.g., similar to a ferrule recessed inward in an MPO connector), or flush with an edge of the connector 102.

In each connector 102 in FIG. 2, two ferrules 130 are depicted, e.g., one for sending optical data signals and another for receiving optical data signals. The ferrules 130 can line up with the alignment features 122 of the four-cable interface 118 depicted in FIG. 1. This may enable the ferrules 130 to convey signals to or from the transceiver 100 through cables 128 extending from the connectors 102 depicted in FIG. 1. Various forms of cables 128 can be used. Generally, the cables 128 can include one or more optical fibers 133 that transition into and/or form a part of the ferrules 130, e.g., such that the ferrules 130 in effect extend into and/or through the cables 128. In some arrangements (such as depicted by the arrangement 125 in FIG. 1), a cable 128 may include multiple optical fibers 133. For example, a first ferrule 130 and a second ferrule 130 of a connector 102 (e.g., FIG. 2) may respectively feed into a first optical fiber 133 and a second optical fiber 133 contained within the cable 128 (e.g., at 125 in FIG. 1). In some arrangements (such as depicted by the arrangement 135 in FIG. 1), a cable 128 may include a single optical fiber 133. For example, a cable 128 having a single optical fiber 133 may feed into a connector 102 that contains a single ferrule 130, such as described further below.

Although the connectors 102 herein are generally illustrated with two ferrules 130, in some embodiments, a different number of ferrules 130 may be utilized. For example, a given connector 102 could include a single ferrule 130. Connectors 102 featuring a single ferrule 130 may be utilized, for example, in scenarios in which different connectors 102 engaged in a single transceiver 100 are utilized for separately establishing separate send and receive channels. Additionally or alternatively, a bi-directional ferrule 130 and/or optical fiber 133 may be useful in connectors 102 that feature a single ferrule 130. For example, light of different wavelengths or colors may be sent or received in order to permit data to travel in both directions along a ferrule 130 and/or optical fiber 133 that is bi-directional. In arrangements that feature a single ferrule 130 in a connector 102 or cable 128 (e.g., as at 135 in FIG. 1), a ferrule 130 or optical fiber 133 that is bi-directional may allow multiple lanes (e.g., for sending and receiving of signals) without resorting to an increased number of cables 128. Bi-directional components additionally or alternatively may be useful in arrangements that feature more than one ferrule 130 and/or optical fiber 133 in a given connector 102 and/or cable 128. For example, bi-directional functionality may allow flexibility to decide whether to use respective components for just sending, just receiving, or both sending and receiving. Additionally, although the interface 118 in FIG. 1 is depicted with eight alignment features 122 (e.g., corresponding to structure that can receive four connectors 102 with two ferrules 130 each), a different number may be used. For example, the interface 118 may include four alignment features 122 (e.g., corresponding to structure that can receive four connectors 102 with one ferrule 130 each), or some other number of alignment features 122 corresponding to compatibility with a mix of single- or multi-ferrule 130 varieties of connectors 102 or other combinations.

Figure 3:
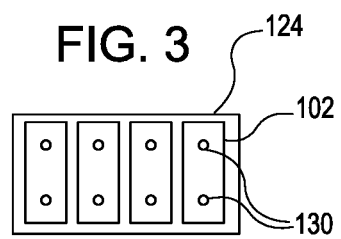
FIG. 3 illustrates an end view of another one of the arrangements of connectors of FIG. 1 according to various embodiments.

FIG. 3 illustrates an end of view of connectors 102 received in a carrier 124 in the first arrangement 104 of FIG. 1. In FIG. 3, the ferrules 130 are arranged within each respective connector 102 in a vertical line or vertically adjacent one another as opposed to as in a horizontal line or horizontally adjacent to one another as depicted in FIG. 2.

In some embodiments, a particular interface 118 may be capable of receiving connectors 102 oriented an arrangement featuring a one by four array (such as the first arrangement 104 or the third arrangement 108 in FIG. 1), and the same particular interface 118 may additionally be capable of receiving connectors oriented in a two by two grid (such as in the second arrangement 106 or the fourth arrangement 110 in FIG. 1). In other embodiments, different arrangements of alignment features 122 and/or other structure of the interface 118 may be implemented depending on the alignment of connectors 102 in a particular arrangement 104, 106, 108, or 110. In some embodiments, such as shown at 145 in FIG. 1, a pair of independently releasable connectors 103 may be sized to engage the transceiver 100 within a space sized to receive one of the other independently releasable connectors 102. For example, a respective connector 102 that features multiple ferrules 130 may be replaced or substituted by other connectors 103 that are smaller and each feature a single ferrule 130. The pair of smaller other connectors 103 are examples of connectors 102, and thus may feature any combination of attributes described for the connectors 102 (e.g., including but not limited to fitting within carriers 124, featuring cables 124 with single optical fibers 133 as at 135, featuring cables 124 with multiple optical fibers 133 as at 125, or fitting within berths within a one by four array or a two by two grid). In some embodiments, pairs of connectors 103 can be engaged in the transceiver 100 alongside a connector 102 of a different size, e.g., which may permit operations with a mixed mode of connectors 102.

Figure 4:
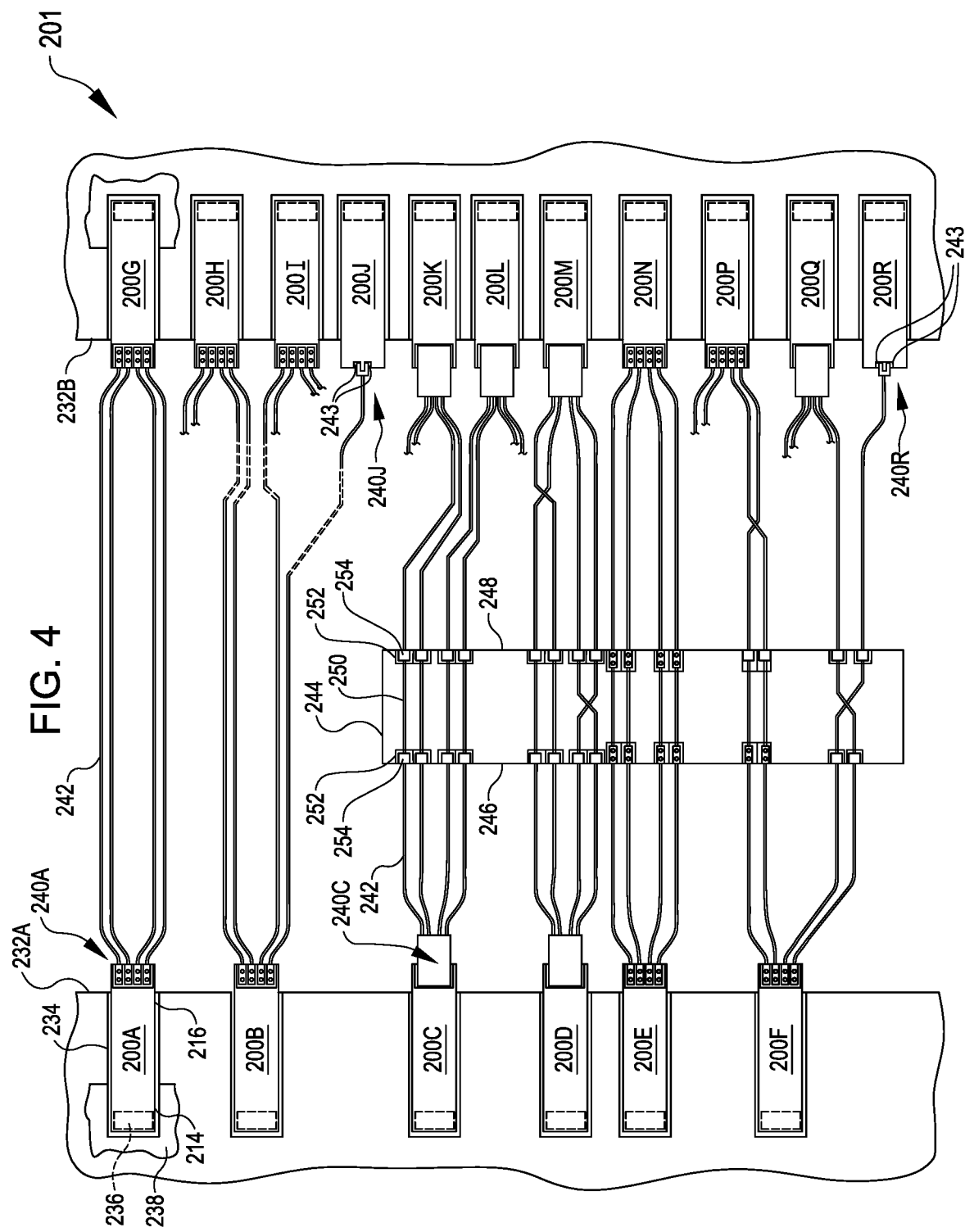
FIG. 4 shows an illustrative example of a datacenter cabling arrangement featuring network switches receiving various transceivers featuring arrangements of FIG. 1 according to various embodiments.

FIG. 4 shows an illustrative example of a datacenter cabling arrangement 201 featuring switches 232 in which various transceivers 200 are received. Although the description below refers primarily to switches 232 having ports 234 in which the transceivers 200 can be received, the ports 234 may correspond to various forms of network appliances, including but not limited to servers, routers, switches, or other forms of networking hardware or datacenter components.

The transceivers 200 in FIG. 4 are individually identified with suffixes A through N and P through R. Some of the transceivers 200 depicted in FIG. 4 correspond to the transceiver 100 having the four-cable interface 118 from FIG. 1. Examples include transceivers 200A, B, E, F, G, H, I, N, and P. Others of the depicted transceivers 200 (e.g., transceivers 200C, D, J, K, L, M, and Q) correspond to other forms of transceivers. For example, some of the transceivers 200 may correspond to transceivers that are configured to receive single standardized plugs. Non-limiting examples of such plugs include SC, LC, FC, ST, or MPO connectors. Embodiments are not limited to the particular arrangement of transceivers 200 shown; rather FIG. 4 merely shows an example arrangement that is useful for identifying various features, techniques, or other aspects with reference to transceivers having the four-cable interface 118.

The switches 232 in FIG. 4 include a first switch 232A and a second switch 232B. Although FIG. 4 only shows two switches 232 for the sake of simplicity, any of the ports 234 and respective transceivers 200 could alternatively correspond to other additional switches 232. Thus, although FIG. 4 illustrates various arrangements of transceivers 200 and related components that would facilitate data transfer between the two switches 232, such arrangements could also equally be utilized to provide data transfer between more than two switches 232. Additionally, arrangements could equally correspond to transceivers 200 received in a single switch 232, e.g., to convey data between different portions.

Various elements will now be described with respect to transceiver 200A. Although some of these elements are only identified by numerals with respect to transceiver 200A in FIG. 4, other transceivers 200 may also have corresponding structure that matches, although not specifically identified by reference number so as to not clutter the figure. The respective transceiver 200A is depicted received within a port 234 of a corresponding switch 232A. At a first end 214 of the transceiver 200A, the transceiver 200A can include a circuitry interface 236. For example, the circuitry interface 236 may correspond to pins or metallic traces or any other suitable structure for interfacing with a circuit board 238 for transfer of data between the transceiver 200A and the circuit board 238 of the switch 232A. For example, the circuitry interface 236 and the circuit board 238 may include appropriate structure for permitting data to be transferred when the transceiver 200A is received and engaged within the port 234.

The transceivers 200 in FIG. 4 at a second end 216 generally each include a cable interface 240. At the cable interface 240, suitable structure may be included for connecting with structure on the ends of respective cables 242 that may provide data transmission, for example, via a fiber conduit extending through the cables 242. The transceivers 200 may include suitable components to convert data received through the circuitry interface 236 into optical signals that can be sent out through the cable interface 240 and vice versa (e.g., converting optical signals into electrical signals readable via the circuitry interface 236).

Three different types of cable interface 240 are shown in FIG. 4. Transceiver 200A (among others) is depicted with the first type. The cable interface 240A of transceiver 200A may correspond to the four-cable interface 118 and associated structure described with respect to FIG. 1. Although the depiction in FIG. 4 more closely resembles the vertically adjacent ferrules 130 depicted in FIG. 3, the transceivers 200 in FIG. 4 may equally include a four-cable interface 118 that more closely resembles the horizontally adjacent ferrules 130 of FIG. 3. Provision of a four-cable interface 118 for a transceiver 200 may facilitate a wide variety of possible connections from one transceiver 200 to one or more other transceivers 200, including examples described further below.

The two other types of cable interface 240 depicted in FIG. 4 (e.g., respectively depicted at transceiver 200C and 200R, among others) may correspond to types that might be replaced in a retrofitting operation. For example, a retrofitting operation might update or upgrade the datacenter cabling arrangement 201 to feature the cable interface 240A in lieu of or in addition to the cable interfaces 240C and 240R.

The second type (e.g., the cable interface 240C) is depicted as a single plug from which multiple cables 242 extend as a breakout. This may correspond to a single plug received in a single opening in the cable interface 240, yet may include multiple ferrules that are aligned by the action of the plug being so received. One non-limiting example of a cable type that might be represented by the cable interface 240C is an MPO connector that transitions into a cable that breaks out into several LC connectors at an opposite end. Another non-limiting example of a cable type that might be represented by the cable interface 240C is cable that is permanently or fixedly mounted to the transceiver 200C (e.g., hard-wired) at one end and breaks out into several LC connectors at an opposite end.

The third type (e.g., the cable interface 240R) is depicted as a single plug that is sized and arranged to extend into multiple openings 243 and the cable interface 240R. A non-limiting example of such may be an LC duplex connector.

A patch panel 244 is also depicted in FIG. 4. The patch panel 244 includes a first side 246 and a second side 248. Suitable internal wiring 250 is included to provide connection between respective jacks 252 on the opposite sides 246 and 248 of the patch panel 244.

In some scenarios, the patch panel 244 may be relied upon for splitting input from a single plug (e.g., as at 200C) into separate channels. For example, the transceiver 200C is shown having cabling 242 that extends from a cable interface 240C through a break-out into respective connectors 254 that are received into jacks 252 on the first side 246 of the patch panel 244, from which the internal wiring 250 provides connection to corresponding jacks 252 on the second side 248 of the patch panel 244 to feed into cables 242 by which connection is made to transceivers 200K and 200L.

Different varieties of connections may be established via the patch panel 244. In some situations, the patch panel 244 may facilitate one to one connection. For example, the depicted transceiver 200D includes breakouts that engage the patch panel 244 and are all connected to breakouts of a single other transceiver 200M. As desired, the internal wiring 250 or cabling 242 extending from the patch panel 244 may be routed with any appropriate crossing or switching arrangement to allow a desired alignment between respective channels, e.g., as illustrated in the connection between transceivers 200D and 200M. In some situations, the patch panel 244 may additionally or alternatively facilitate branched or one to many connection. One example is the connection of transceiver 200C via the patch panel 244 to transceivers 200K and 200L as described above.

In some arrangements, including the four-cable interface 118 (e.g., as at cable interface 240A, among others), can permit a patch panel 244 to be eliminated or obviated. Eliminating or obviating the patch panel 244 may reduce a number of connections that may each introduce losses in the signal integrity conveyed between respective transceivers 200. Eliminating or obviating the patch panel 244 may also allow for the space that would otherwise be occupied by the patch panel 244 to be used for other, potentially more valuable purposes, such as for mounting additional switches, servers, or other datacenter components. As examples of arrangements in which the patch panel 244 may be obviated, transceiver 200A is shown directly connected to transceiver 200G without a patch panel 244 intervening, and transceiver 200B is shown directly connected to the multiple transceivers 200H, 200I, and 200J without a patch panel 244 intervening. The independently releaseable nature of the cables 242 at the transceiver 200B, for example, may permit for ready introduction of appropriately varying lengths of cable 242 to reach transceivers 200H, 200I, and 200J that may be at different distances away. Any suitable size of cable 242 can be used to reach from one transceiver 200A having a four-cable interface 118 to reach an appropriate distance to another transceiver 200, while other suitable lengths of cable 242 may be utilized to reach still other transceivers 200. This may provide greater flexibility for configuring than with a single plug arrangements such as at transceiver 200C, which may rely on the patch panel 244 to accommodate a fixed length of the cabling 242 extending in a break-out from the single plug.

Although a patch panel 244 may be eliminated in some embodiments by use of transceivers 200 that feature four-cable interfaces 118, in some embodiments, transceivers 200 using four-cable interfaces 118 may nonetheless use a patch panel 244. The patch panel 244 may be used to communicatively couple a four-cable interface 118 in a one to one manner or in a one to many manner. As one example, the four-cable interface 118 of the transceiver 200E is shown routed via the patch panel 244 in a one to one fashion to transceiver 200N. As another example, the four-cable interface 118 of the transceiver 200F is shown routed via the patch panel 244 in a one to many fashion to transceivers 200P, 200Q, and 200R.

Transceivers 200 using four-cable interfaces 118 without a patch panel 244 may additionally or alternatively communicatively couple in a one to one manner or in a one to many manner. As one example, the transceiver 200A is shown with a cable interface 240A that includes a four-cable interface 118 that is routed in a one to one manner to the transceiver 200G. As another example, the four-cable interface 118 of the transceiver 200B is shown routed in a one to many manner to the transceivers 200H, 200I, and 200J.

In some embodiments, a transceiver 200 having a four-cable interface 118 can be connected via a suitable cable 242 to a transceiver 200 having a different type of cable interface 240. Cables 242 extending from four-cable interfaces 118 can include any suitable form of connector at an opposite end. In some embodiments, at least some of the opposite ends are also compatible with four-cable interfaces 118. As some examples, the cables 242 extending from the four-cable interfaces 118 of the transceivers 200A and 200B each terminate in respective four-cable interfaces 118 at transceivers 200G, 200H, and 200I. As further examples, at least some of the cables 242 extending from the four-cable interfaces 118 of transceivers 200E and 200F terminate at the patch panel 244 in connectors compatible with four-cable interfaces 118.

In some embodiments, cables 242 extending from four-cable interfaces 118 can terminate in different forms of connector at opposite ends of the cables 242. As one example, a cable 242 extending from the four-cable interface 118 of transceiver 200B is shown terminating at transceiver 200J in the form of connector consistent with the cable interface 240J (similar to the cable interface 240R), e.g., such as an LC duplex connector or other connector having a single plug that is sized and arranged to extend into multiple openings 243 in the cable interface 240J. As another example, a cable 242 extending from the four-cable interface 118 of transceiver 200F is shown terminating at the patch panel 244 in an LC simplex connector or other connector having a single plug sized and arranged to fully occupy the jack 252. In some embodiments, providing cables 242 that are compatible at one end with four-cable interfaces 118 and are compatible at an opposite end that terminate in some other form of connector can allow for communicatively coupling with other interfaces either directly (as illustrated e.g., by the transceiver 200B that is connected directly to transceiver 200J), or indirectly (as illustrated e.g., by the transceiver 200F communicatively coupling via the patch panel 244 to the transceivers 200Q and 200R). In some embodiments, a cable 242 can include different varieties shown in FIG. 1, such as having one end that terminates in a connector 102 that includes two ferrules 130 and a second end that terminates in a pair of connectors 103 that each include a single ferrule 130.

In some embodiments, cables 242 extending from four-cable interfaces 118 terminate in forms of connectors that differ from one another. As one example, the cables 242 extending from the four-cable interface 118 at transceiver 200F is shown with two cables that terminate at the patch panel 244 in connectors compatible with another four-cable interface 118 and with two cables that terminate at the patch panel 244 in other types of connectors such as an LC simplex connector or other connector having a single plug sized and arranged to fully occupy the jack 252. As another example, the cables 242 extending from the four-cable interface 118 at transceiver 200B is shown with three cables 242 that terminate in connectors compatible with other four-cable interfaces 118 at transceivers 200H and 200I and with one cable that terminates at the transceiver 200J in another type of connector such as an LC duplex connector or other connector having a single plug that is sized and arranged to extend into multiple openings 243 in the cable interface 240J.

In some embodiments, the patch panel 244 may provide a conversion between transceivers 200 featuring four-cable interfaces 118 and transceivers that feature other forms of cable interface 240. As one example, a top set of cables 242 extending from the transceiver 200F are shown terminating at the patch panel 244 in connectors compatible with four-cable interfaces 118, while internal wiring 250 provides connection to another form of connector depicted as an LC simplex connector or other connector having a single plug sized and arranged to fully occupy the jack 252 on the second side 246 of the patch panel 244.

Figure 5:
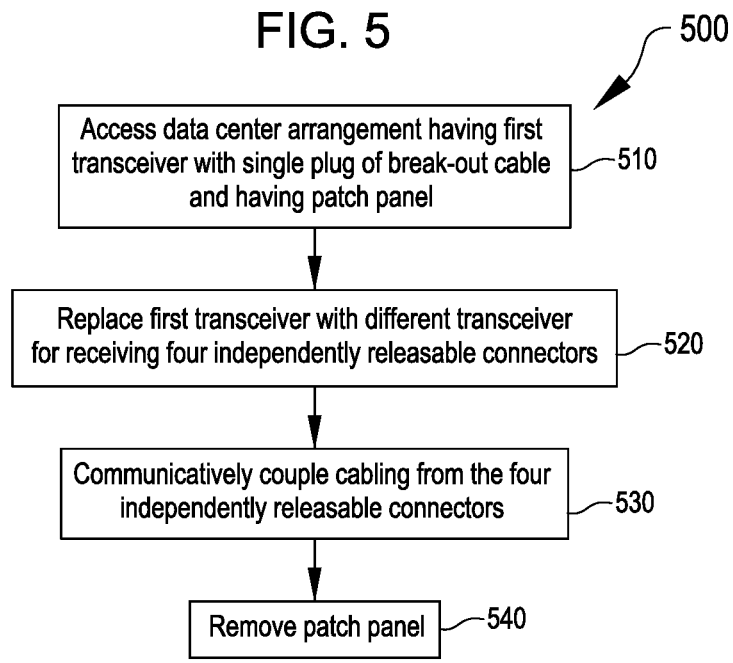
FIG. 5 is a flowchart illustrating a process that may be used for retrofitting a datacenter according to various embodiments.

FIG. 5 is a flowchart illustrating a process 500 that may be performed for retrofitting according to certain embodiments. The process 500 at operation 510 can include accessing a datacenter arrangement having a first transceiver with a single plug of a breakout cable and also having a patch panel. This may include, as one illustrative example, accessing an arrangement such as in FIG. 4 at transceiver 200C at which a single plug in the cable interface 240C is connected via the patch panel 244 to multiple other transceivers 200K and 200L. As another illustrative example with respect to FIG. 4, access may be to the transceiver 200D at which a single plug is connected via the patch panel 244 to a single other transceiver 200M.

At 520, the method can include replacing the first transceiver with a different transceiver for receiving four independently releasable connectors. For example, with respect to FIG. 4, the operation at 520 may involve replacing the transceiver 200C and/or transceiver 200D with a transceiver 200A that includes the cable interface 240 featuring a four-cable interface 118. The operation at 520 (and/or other operations of the process 500) may facilitate eliminating of the patch panel or be included in a process of eliminating the patch panel.

The operation at 530 includes communicatively coupling cabling from the four independently releasable connectors. This may include connecting ports of the one or more network switches that were previously connected via the patch panel. In some embodiments, connecting the ports may be performed by routing cabling that extends from at least one of the four independently releasable connectors to one of the originally received transceivers that was connected via the patch panel. As an illustrative example, this could result in an arrangement such as shown in FIG. 4 by the four-cable interface 118 of the transceiver 200B feeding into at least one cable 242 that runs into the transceiver 200J that features a different style of cable interface 240J. In some embodiments, connecting the ports may include replacing a number of the originally connected transceivers with new transceivers that also feature four independently releasable connectors and then routing cabling between the new transceivers (e.g., without using the patch panel). As an illustrative example, this could correspond to the transceivers 200K and 200L being removed along with the transceiver 200C, and then replaced to reflect an arrangement similar to the arrangement between transceivers 200H and 200I relative to transceiver 200B.

The process 500 at operation 540 can include removing the patch panel. For example, this may entail removing the patch panel 244 from the datacenter cabling arrangement 201 in FIG. 4 on the basis of the patch panel 244 no longer being useful or needed for connecting respective transceivers 200 and different switches 232 since the transceivers 200 are instead directly connected via the cabling 242 extending from one four-cable interface 118 to another cable interface 240, which may include another four-cable interface 118 or a different variety of cable interface 240.

Figure 6:
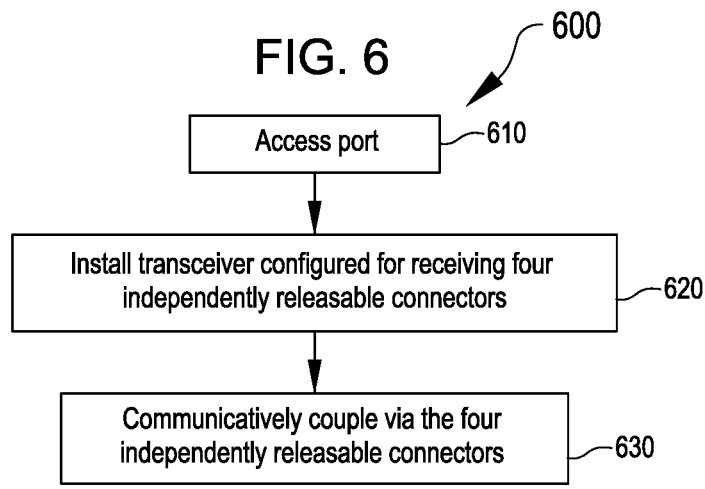
FIG. 6 is a flowchart illustrating a process for configuring a datacenter according to various embodiments.

FIG. 6 illustrates a flowchart that illustrates a process 600, for example, that may be used for initially configuring a datacenter. The process 600 at operation 610 can include accessing a port. For example, the port may be a port 234 that receives a transceiver 200 such as shown in FIG. 4.

The process 600 at operation 620 can include installing a transceiver configured for receiving four independently releasable connectors. This can include installing the transceiver into the port such that a first end of the transceiver engages the port for transfer of data. As one example, the operation 620 may correspond to installing the transceiver 200A of FIG. 4 so that the circuitry interface 236 engages the circuit board 238 of the switch 232A.

The process 600 at 630 can include communicatively coupling via the four independently releasable connectors. For example, this may involve coupling the first transceiver via the four independently releasable connectors with one or more of other network switch ports by routing cabling that extends from at least one of the four independently releasable connectors of the transceiver to one or more transceivers received in other network switch ports. As an illustrative example, the operation at 630 may include routing cabling 242 to extend from the cable interface 240A of the transceiver 200A to the transceiver 200G. Routing the cabling 242 may involve initially inserting connectors 102 into the four-cable interface 118 or may equally include routing cables 128 from connectors 102 that are already engaged. As other examples, routing cabling may include directly routing from the transceiver 200B to any of transceivers 200H, 200I, or 200J; indirectly routing from transceiver 200E to transceiver 200N (e.g., via the patch panel 244); or indirectly routing from the transceiver 200F to any of transceivers 200Q or 200R (e.g., via the patch panel 244).

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method of retrofitting datacenter cabling, comprising:
   accessing a datacenter cabling arrangement that comprises:
      a first transceiver comprising an optical transceiver, the first transceiver including a first end engaged in a first network port, the first transceiver further including a second end receiving a single plug of a break-out cable, the break-out cable extending from the single plug to a plurality of connectors; and
      a patch panel having a first side receiving the plurality of connectors from the break-out cable, the patch panel further having a second side connected to the first side for conveying data between the plurality of connectors and one or more transceivers coupled to the second side via cabling, the one or more transceivers being respectively received in one or more other network ports; and
   eliminating the patch panel from the cabling arrangement by:
      replacing the first transceiver with a different transceiver that comprises another optical transceiver, the different transceiver including another first end configured to engage the first network port, the different transceiver further including a different second end with a receiving port configured to receive four independently releasable connectors;
      communicatively coupling the different transceiver with said one or more other network ports by:
         routing other cabling that extends from at least one of the four independently releasable connectors received in the different transceiver to at least one of said one or more transceivers received in said one or more other network ports; or
         replacing a number of said one or more transceivers received in said one or more other network ports with the number of other transceivers and routing different cabling that extends from at least one of the four independently releasable connectors received in the different transceiver to at least one of said number of other transceivers; and
      removing the patch panel.

2. The method of claim 1, wherein the first transceiver and the different transceiver are each a type of transceiver selected from among a group including QSFP, QSFP+, QSFP28, QSFP56, QSFP56-DD, and OSFP.

3. The method of claim 1, wherein the single plug of the breakout cable is permanently or fixedly mounted to the first transceiver.

4. The method of claim 1, wherein the single plug of the breakout cable is releasably attached to the first transceiver.

5. The method of claim 1, wherein the single plug of the breakout cable has a duplex form factor such that the second end of the first transceiver includes two openings.

* * * * *